Sept. 6, 1966  R. B. STUART  3,270,774
MULTIPLE VALVE
Filed Feb. 5, 1965  2 Sheets-Sheet 1
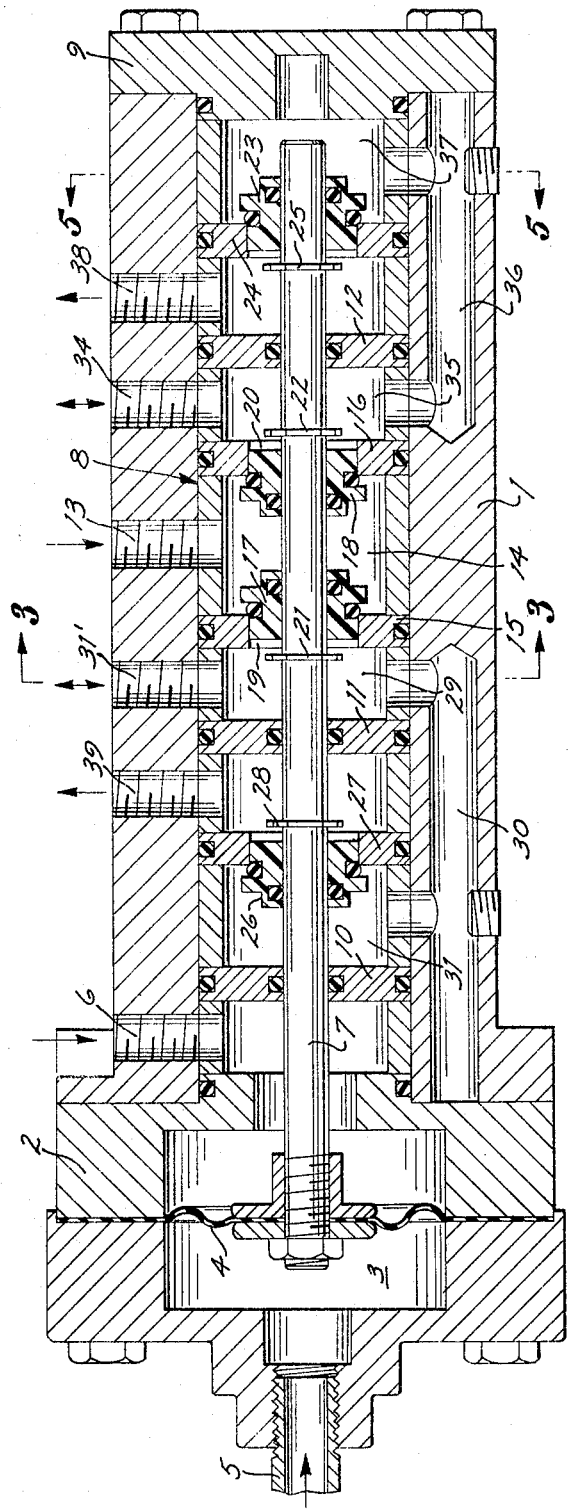
FIG.2
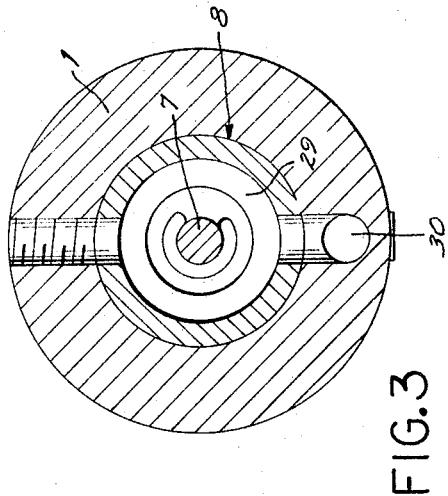
FIG.3
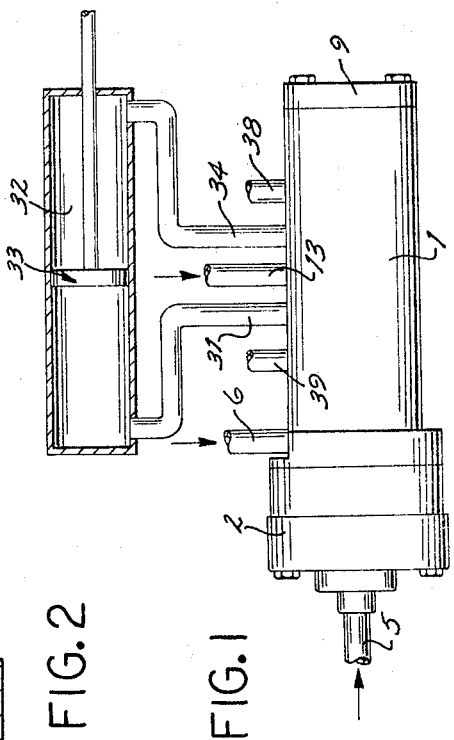
FIG.1
INVENTOR.
ROBERT B. STUART
BY
ATTORNEY

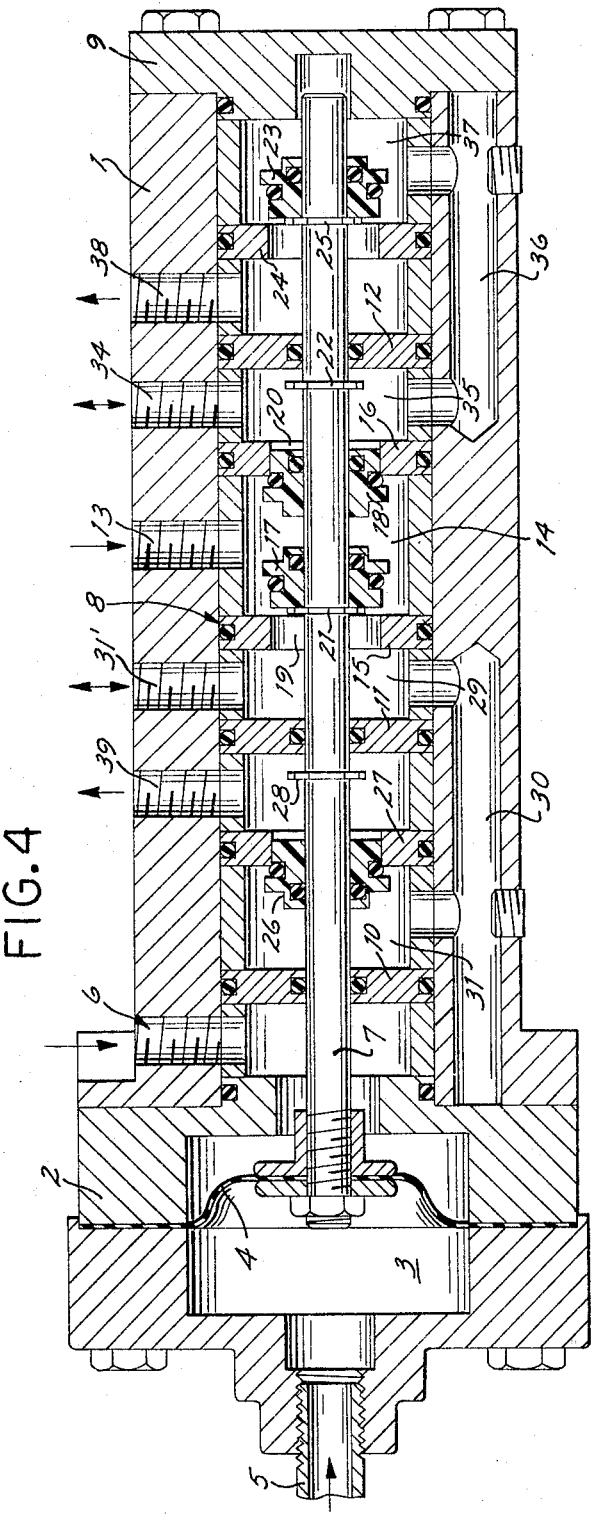
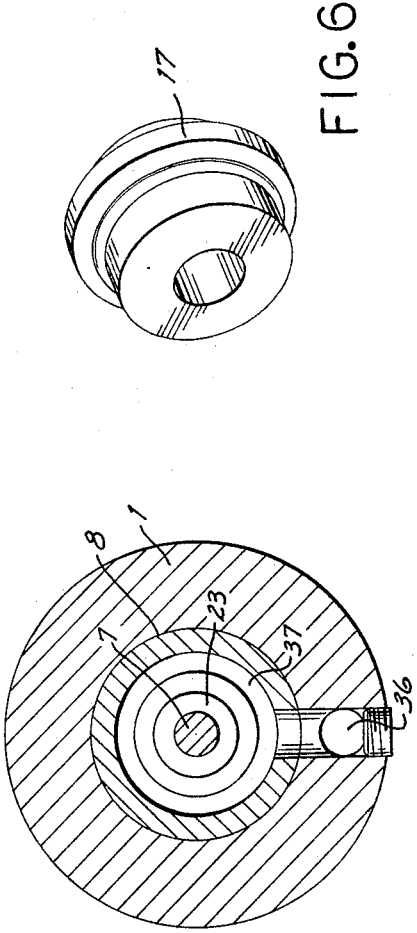

United States Patent Office 3,270,774
Patented Sept. 6, 1966

3,270,774
MULTIPLE VALVE
Robert B. Stuart, 936 Calimesa Blvd., Calimesa, Calif.
Filed Feb. 5, 1965, Ser. No. 430,595
4 Claims. (Cl. 137—596.18)

This invention relates to a multiple valve, and particularly to a valve which will control the flow of fluid under pressure to an operating unit which performs useful work.

An object of my invention is to provide a multiple valve which will remain in a full throw position until power is exerted to change the position of the valve.

Another object of my invention is to provide a multiple valve which will not creep or change its position until the valve is actuated by the power unit within the valve.

Still another object is to provide a novel multiple valve in which a power actuated rod is movable in two directions, and this rod when moved will unseat spool valves within the valve body to direct fluid to various ports in the valve.

Still another object of my invention is to provide a novel multiple valve in which fluid under pressure in one compartment of the valve will be directed to a second compartment of the valve to cause seating of a spool valve in the second compartment.

Other objects, advantages and features of invention may appear from the accompanying drawing, the subjoined detailed description and the appended claims.

In the drawing:

FIGURE 1 is a diagrammatic valve partly in section illustrating one use of my multiple valve.

FIGURE 2 is a longitudinal vertical sectional view of my multiple valve.

FIGURE 3 is a transverse sectional view taken on line 3—3 of FIGURE 2.

FIGURE 4 is a longitudinal vertical sectional view showing another position of the parts of my multiple valve.

FIGURE 5 is a sectional view taken on line 5—5 of FIGURE 2.

FIGURE 6 is a perspective view of one of the spool valves.

Referring more particularly to the drawing, the numeral 1 indicates a cylindrical valve body in which the various units of the valve are positioned, as will be subsequently described. A head 2 on one end of the body 1 includes a pressure chamber 3. This pressure chamber is divided transversely by a flexible diaphragm 4. Pressure lines or intakes 5 and 6 extend into the chamber 3 and exert pressure on one side or the other of the diaphragm 4, to cause this diaphragm to flex back and forth as is required to operate the valve. A rod 7 is attached at one end to the diaphragm 4, and this rod extends lengthwise of the body 1 and on the longitudinal center line thereof. A bore 8 extends lengthwise of the body 1 and is closed at one end by the head 2, and at the other end by a cap 9; thus the bore is completely sealed at both ends. Transverse walls 10, 11 and 12 divide the bore 8 into several chambers, and these walls sealingly engage the bore 8 at their outer periphery, and also are sealed against the rod 7 so that there is no leakage from one side to the other of any of these walls. Suitable ring packing or the like is used to effect these seals. Thus the rod 7 can move lengthwise through the walls 10, 11 and 12, but without permitting leakage from one side of these walls to the other. A main pressure port 13 permits fluid under pressure to be admitted to the chamber 14 within the body 1 of the valve. The fluid here referred to may be either liquid or gas under appropriate pressure. The chamber 14 is defined on one side by a wall 15, and on the other side by a wall 16. A pair of spool valves 17 and 18 are slidably mounted on the rod 7 and these spool valves each control appropriate ports 19 and 20 in the walls 15–16 respectively. The spool valve 17 is engaged and moved by a pickup shoulder 21 on the rod 7, and the spool valve 18 is similarly moved by the rod 7 by the pickup shoulder 22. The spool valves 17 and 18 are unseated by opposite movements of the rod 7, that is, only one of these spool valves is unseated during one directional movement of the rod 7. Another spool valve 23 is mounted adjacent the outer end of the rod 7, and this spool valve controls a port in the transverse wall 24. The spool 23 is engaged and unseated by the shoulder 24 which moves the spool 23 in one directional movement of the rod 7. Still another spool valve 26 is slidably mounted on the rod 7 and this spool valve controls a port in the transverse wall 27. The spool valve 26 is engaged and unseated by the shoulder 28 on the rod 7 and during one directional movement of the rod.

Assuming first that pressure is exerted by a suitable fluid through the pipe or port 15 against one side of the diaphragm 4, the parts will then assume the position shown in FIGURE 4. The shoulder 21 will unseat the spool 17. At the same time the shoulder 25 will engage and unseat the spool 23. The fluid under pressure which is passing through the port 13 will now pass out through the opening 19 in the wall 15 into a chamber 29. The spool 18 will be held against the wall 16 by pressure within the chamber 14. The fluid under pressure having passed into the chamber 29 is now transferred through the by-pass passage 30 to the chamber 31, where pressure is exerted against the spool 26 to hold that spool in seated position. Fluid can now pass out of the valve body 1 through the port 31' and thence to a unit performing useful work, such as the cylinder 32 and the reciprocating piston 33 therein. The piston 33 will then be moved through its full stroke and the valve parts within the body 1 will remain in the positions described, until the rod 7 is moved in the opposite direction by fluid pressure in the port 6. The fluid in the cylinder 32 on the side opposite the piston 33 where pressure is exerted will be exhausted through the pipe line 34, and thence into the chamber 35 within the valve body 1. A by-pass duct 36 extends from the chamber 35 to the chamber 37, and since the spool 23 is unseated, as shown in FIGURE 4, the fluid can drain out through the port 38 which thus exhausts one side of the cylinder 32.

When the position of the control rod 7 is reversed from that shown in FIGURE 4, that is, when fluid pressure is exerted at the port 6, then the spool valve 18 will be unseated thereby directing fluid under pressure through the port 34 and thence to one side of the piston 33, thus reversing its stroke from that previously described. The other side of the cylinder 32 will be exhausted through the pipe 31 and thence to the exhaust port or line 39, since the spool valve 26 is now unseated in that the shoulder 28 has engaged and unseated the same.

In operation

Assuming first that the valve has been positioned, as shown in FIGURE 4, with fluid under pressure being exerted through the pipe line 5. This shifts the rod 7 towards the right, as shown in FIGURE 4, and moves the spool valves 17 and 23 to open position. The pickup shoulders 21 and 25 engage these spool valves to unseat them. Fluid under pressure is being introduced through the port 13 and flows through the opening 19 in the wall 15 and thence through the by-pass duct 30, to exert pressure on the back of the spool valve 26 and hold the same in closed position. The pressure in chamber 14 also holds the spool valve 18 on its seat. Since the valve 17 is now unseated, pressure fluid flows through the pipe line 31' and thence to one side of the piston 23 to actuate this piston. The fluid which fills the cylinder 32 on the opposite side of the piston 33 will return to the valve through the pipe line 34, and since the valve 23 is unseated this exhaust fluid will pass through the by-pass duct 36, thence out through the exhaust port 38. The valve parts remain in their adjusted position until it is intentionally changed by introducing pressure through the port 6, which then pushes the rod 7 in the opposite direction, which then opens the spool valves 18 and 26 and closes the spool valves 17 and 23. This reverses the flow to the actuated mechanism, such as the cylinder 32.

The by-pass ducts 30 and 36 enables pressure fluid to be exerted against the spool valves 26 and 23, thus enabling these spool valves to be seated in certain positions of the valve without the use of springs, and also holding these valves securely in seated position by pressure of the fluid in the valves. Also when the spool valves are unseated by movement of the rod 7 as described, these valves also will remain in open position, due to the flow of fluid under pressure past the spool valves.

Having described my invention, I claim:

1. A multiple valve comprising a body,
   a rod within the body and positioned on the longitudinal center line of the body,
   actuating means connected to said rod to move said rod lengthwise within said body,
   said body having a pressure chamber therein and a pair of walls defining the ends of said chamber,
   said body having a pressure inlet port extending into said chamber,
   said body having a second chamber therein adjacent the first named pressure chamber and a port extending from the second chamber,
   said body having a third chamber therein adjacent the second chamber and a port extending from the third chamber,
   said body having a fourth chamber therein adjacent the third chamber, and a by-pass duct extending from the second to the fourth chambers,
   said rod extending through each of said chambers,
   spool valves slidably mounted on said rod, one of said spool valves controlling fluid flow between the first and second chambers, and another spool valve controlling fluid flow between the third and fourth chambers,
   and separate means on said rod engageable with each of said spool valves to unseat the spool valves.

2. A multiple valve comprising a body,
   a rod within the body and positioned on the longitudinal center line of the body,
   actuating means connected to said rod to move said rod lengthwise within said body,
   said body having a pressure chamber therein and a pair of walls defining the ends of said chamber,
   said body having a pressure inlet port extending into said chamber,
   said body having a second chamber therein adjacent the first named pressure chamber and a port extending from the second chamber,
   said body having a third chamber therein adjacent the second chamber and a port extending from the third chamber,
   said body having a fourth chamber therein adjacent the third chamber, and a by-pass duct extending from the second to the fourth chambers,
   said rod extending through each of said chambers,
   spool valves slidably mounted on said rod, one of said spool valves controlling fluid flow between the first and second chambers, and another spool valve controlling fluid flow between the third and fourth chambers,
   and separate fixed pickup shoulders on said rod engageable with each of said spool valves to unseat the spool valves on longitudinal movement of said rod.

3. A multiple valve comprising a body,
   a rod within the body and positioned on the longitudinally center line of the body,
   actuating means connected to said rod to move said rod lengthwise within said body,
   said body having a pressure chamber therein and a pair of walls defining the ends of said chamber,
   one of said walls having a fluid opening therein,
   said body having a pressure inlet port extending into said chamber,
   said body having a second chamber therein adjacent the first named pressure chamber and a port extending from the second chamber,
   said body having a third chamber therein adjacent the second chamber and a port extending from the third chamber,
   said body having a fourth chamber therein adjacent the third chamber, and a by-pass duct extending from the second to the fourth chambers,
   said rod extending through each of said chambers,
   spool valves slidably mounted on said rod, one of said spool valves controlling fluid flow between the first and second chambers, and another spool valve controlling fluid flow between the third and fourth chambers,
   one of said spool valves being seated in the fluid opening in one of said walls,
   and separate means on said rod engageable with each of said spool valves to unseat the spool valves.

4. A multiple valve comprising a body,
   a rod within the body and positioned on the longitudinal center line of the body,
   actuating means connected to said rod to move said rod lengthwise within said body,
   said body having a pressure chamber therein and a pair of walls defining the ends of said chamber,
   one of said walls having a fluid opening therein,
   said body having a pressure inlet port extending into said chamber,
   said body having a second chamber therein adjacent the first named pressure chamber and a port extending from the second chamber,
   said body having a third chamber therein adjacent the second chamber and a port extending from the third chamber,
   said body having a fourth chamber therein adjacent the third chamber, and a by-pass duct extending from the second to the fourth chambers,
   said rod extending through each of said chambers,
   spool valves slidably mounted on said rod, one of said spool valves controlling fluid flow between the first and second chambers, and another spool valve controlling fluid flow between the third and fourth chambers,
   one of said spool valves being seated in the fluid opening in one of said walls,
   and separate fixed pickup shoulders on said rod engageable with each of said spool valves to unseat the spool valves on longitudinal movement of said rod.

No references cited.

M. CARY NELSON, *Primary Examiner.*

WALTER JOHNSON, *Examiner.*